United States Patent [19]
Kuehl

[11] 3,949,619
[45] Apr. 13, 1976

[54] RESIDUAL GEARING TRANSMISSION INCLUDING SATELLITE CARRIER PROVIDED WITH INVERTED CONTINUOUS CHAIN LOOP

[75] Inventor: Guenther L. Kuehl, Peekskill, N.Y.

[73] Assignee: Resid-Trans., Inc., Buchanan, N.Y.

[22] Filed: Oct. 7, 1974

[21] Appl. No.: 512,536

[52] U.S. Cl..................................... 74/225; 74/751
[51] Int. Cl.² ........................ F16H 7/00; F16H 3/74
[58] Field of Search....... 74/216.5, 217 R, 225, 226, 74/227, 751

[56] References Cited
UNITED STATES PATENTS

| | | | |
|---|---|---|---|
| 2,197,014 | 4/1940 | Stenzy................................. | 74/751 |
| 2,641,137 | 6/1953 | Orcutt et al...................... | 73/217 R |

*Primary Examiner*—John J. Camby

[57] ABSTRACT

Residual gearing transmission which includes a rotary planetary satellite carrier that carries an annular array of a plurality of rotatably mounted and angularly spaced satellite gear units for driven rotation about the axes of these units independently of rotation of the carrier. An output gear is rotatably mounted coaxially with respect to this carrier and is also rotatable independently of the latter. A continuous inverted drive chain loop has an outer run lapped about the outer sides of the satellite gear units to extend at opposite ends of this outer run to between an adjacent pair of such units for providing an inner run that is lapped about the output gear. A first input drive means is drivably connected to the plurality of satellite gear units to rotate them simultaneously, and a second input drive means to this carrier. Provision may be made in embodiments for simultaneous drive of the satellite gear units and the satellite carrier at independently controllable relative speeds, or for temporarily holding the carrier fixed while the satellite gear units are driven, or for driving the carrier by one infinitely variable speed change driver while employing another driving input means for drive of the satellite gear units.

7 Claims, 9 Drawing Figures

RESIDUAL GEARING TRANSMISSION INCLUDING SATELLITE CARRIER PROVIDED WITH INVERTED CONTINUOUS CHAIN LOOP

BACKGROUND OF THE INVENTION

This invention relates to planetary power transmissions designed to provide speed change at a rotary output in relation to rotary driven input. An interesting prior art disclosure is that of Stenzy U.S. Pat. No. 2,197,014.

The speed increasing gearing system of this Stenzy patent is nothing more than a variant of the prior art proposals of planatory transmissions. In the disclosure of the basic form of the Stenzy system, such as that proposed in FIGS. 1 to 4 incl. thereof, the input and output are arranged coaxially, with shaft 10 being driven as the input and carrying fixed thereto pinions or driving sprockets 19 and 20 respectively driving through chains arrays of angularly spaced satellite pinions 26 and 29 respectively rotatably supported within the coaxially arranged inner box frame 12 and the larger encasing box frame 11. The rotary output force is either taken off of the peripheral drum provided by frame 11 or its hollow hub 13 coaxially arranged about input shaft 10. An outside loop of an endless chain is entrained about the array of satellite pinions 29, rotatably supported within outer frame 11, and an inside loop of this chain is inverted to within the remainder thereof for lap about the array of pinions 26 that are rotatably supported by the inner frame 12. However, this system lacks a greatly simplifying and thus economizing, unique feature of the present invention, i.e. connecting the coaxial output through an inverted loop of an endless chain which is lapped about an array of angularly spaced satellite pinions that are rotatably supported by a rotatable carrier but without this chain driving the latter, as will be more fully appreciated by information set forth hereinafter. The system of the present invention aptly can be identified as a residual transmission since it is more than just a speed change gearing, which the Stenzy proposal is, since this present invention actually picks up and employs to advantage a difference between two different input speeds.

SUMMARY of the INVENTION

The present invention concerns a residual power transmission which includes a rotary satellite carrier supportable of an annular array of satellite gear units which are rotatably mounted for rotation independent of the carrier, and a continuous inverted endless chain loop having an outer run lapped about these gear units and an inner run formed by leading a section of the loop radially inward between an adjacent pair of the gear units. This inner run is lapped about an output gear which is coaxially mounted relative to the rotatable carrier while being independently rotatable or free running for drive by this inverted endless chain. One input drive means is connected to the plurality of satellite gear units simultaneously to rotate them, and another input drive means is provided to rotate the planetary satellite carrier.

A preferred embodiment may provide for the satellite gear units input drive means an input drive shaft which has fixed thereto a drive sprocket, and an endless drive chain lapped about this drive sprocket and arranged about the satellite carrier in driving association with the satellite gear units, the pitch diameters of this driving sprocket and of the driven circular array of the gear units being determinative of the output speed. Such an embodiment desirably may provide the input drive means for the planetary satellite carrier as an independent sprocket and drive chain assembly with the driving sprocket thereof also mounted on the same input drive shaft, or a separate power source may be provided for rotating this carrier.

Since the sprocket and chain drive assembly that is powered by the input shaft for rotating the satellite gear units in turn causes the latter to translate the continuous inverted chain loop for driving the output means, it can be advantageous in the construction of certain embodiments of the present invention to employ for this purpose the superposed interlocking chain assembly of the Gardiner U.S. Pat. No. 3,583,550 of June 8, 1971. This use will insure a conservation of space in the assembly while assuring a reliable interlocked drive, and effect a considerable economy in the costs of construction.

It is a basic object of the present invention to provide a residual gearing transmission which includes a rotary satellite carrier that rotatably supports in a circumferential zone thereof an annular array of a plurality of angularly spaced satellite gear units for driven rotation about the axes of the latter independently of that of the carrier, and to lap about these driven satellite gear units an outer run of a continuous inverted drive chain loop which has an inner run lapped about, for drive of, an output means. Consequently, the difference between the speed of a separate input drive of the output means by the continuous inverted drive chain loop is available as a residual transmission, which is unique in this art.

Another object of the present invention is to provide various embodiments which by variations satisfy efficiently differing demands.

Other objects of the present invention will in part be obvious and will in part appear from reference to the following detailed description taken in connection with the accompanying drawings, wherein like numerals identify similar parts throughout, and in which:

As will be seen from FIGS. 1 to 5 inclusive, the embodiment of the residual gearing transmission shown therein includes a suitable supporting base plate 10 provided with a pair of standard structures 11 and 12, each respectively supporting gearing subassemblies 13 and 14. It will be seen from FIGS. 1, 4, and 5 that, conveniently, standard 11 is a unitary fork structure and the standard structure 12 consists of a pair of laterally spaced brackets 12a and 12b, all of which are securely bolted to the base plate 10.

It is indicated in FIGS. 1–4 that the standard 11 rotatably supports an input power shaft 15 which may be rotatably driven by any suitable means, symbolically indicated by the crank 16. Gearing subassembly 13, fixed on input shaft 15 for drive thereby, includes a primary driving sprocket 17 and a pair of secondary driving sprockets 18 and 19 which are fixed together.

As will be seen from FIGS. 1–3 and 5 the gearing subassembly 14 includes driven sprocket 20 carried by a hub 21 that is rotatably supported about the rotary output shaft 22 which is in turn rotatably supported by standards 12a and 12b. The hub 21 fixedly carries a rotary carrier 23 with the aid of clamping ring 24. Power output shaft 22 also carries, fixed thereto, a driving sprocket 25, to constitute an output gear which is mounted coaxially with respect to the carrier 23 and rotatable independently of the latter.

Figures 1, 4:
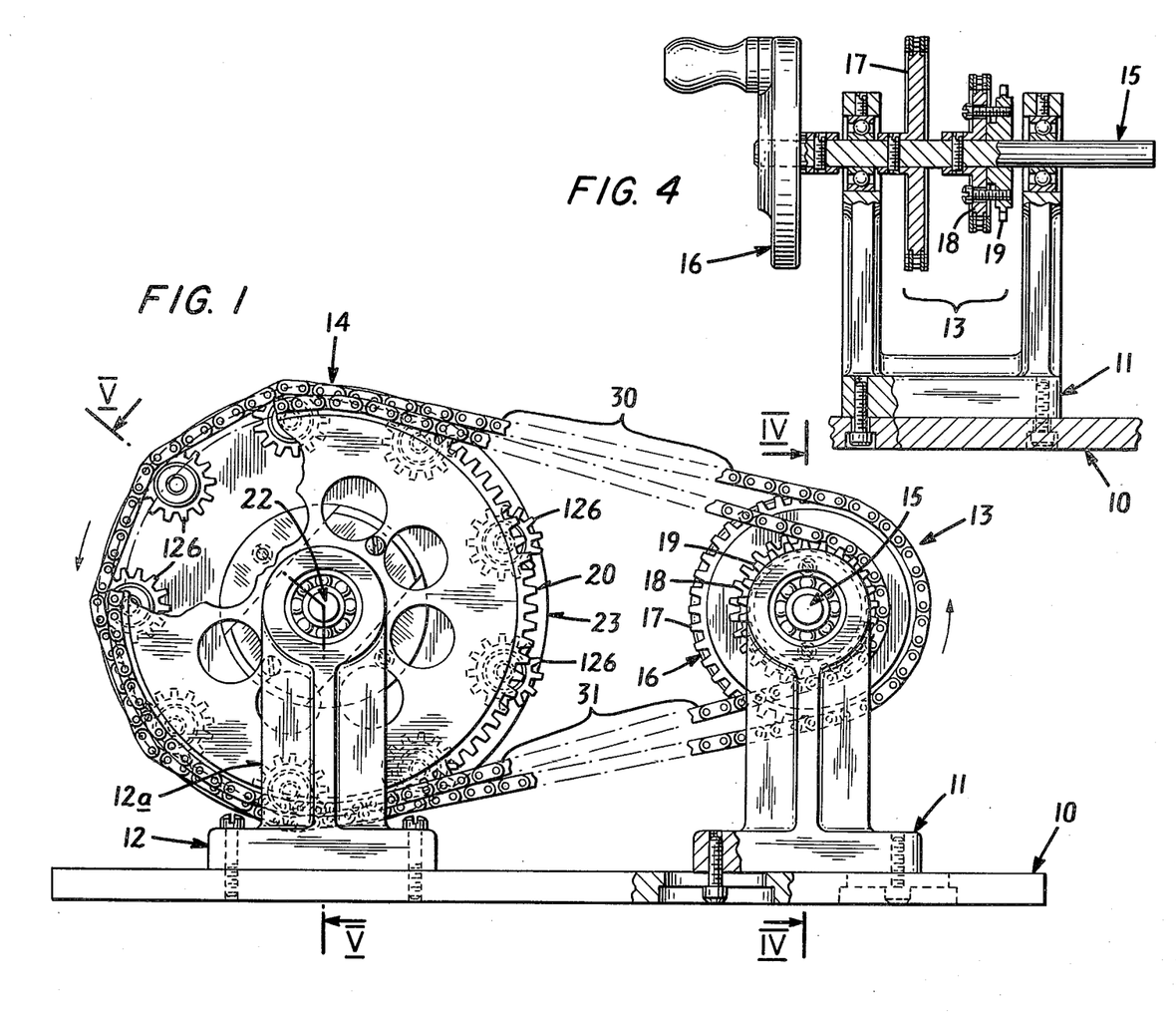
FIG. 1 is a side elevation, with parts broken away in section, of an embodiment of the residual gearing transmission of the present invention.
FIGS. 4 and 5 are sectional views, with some parts shown in elevation and others broken away, taken respectively and substantially on lines IV–IV and V–V of FIG. 1.
Figures 2, 5:
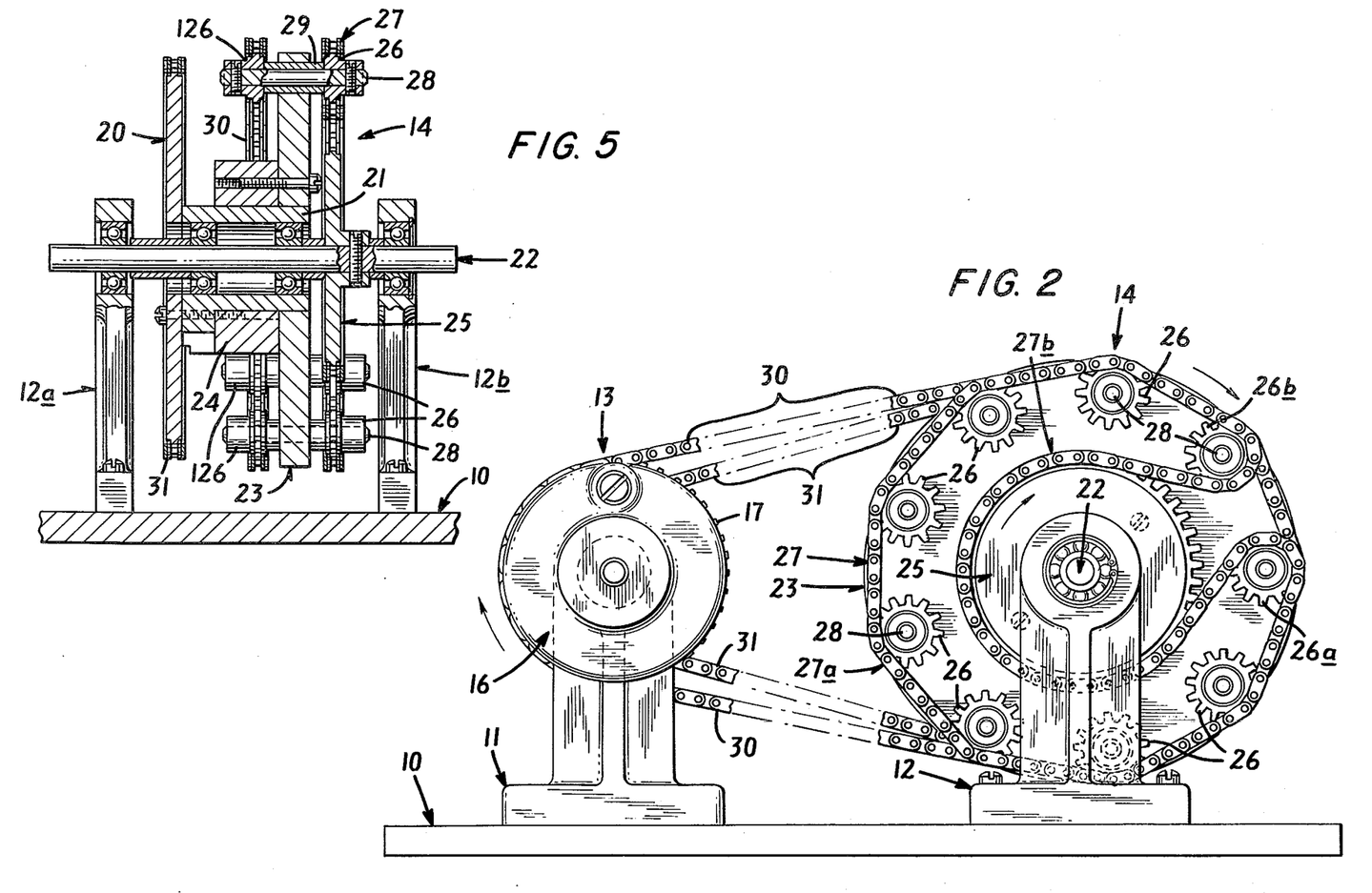
FIG. 2 is the opposite side elevation, with parts broken away and symbolically indicated, of the apparatus depicted in FIG. 1.
Figure 3:
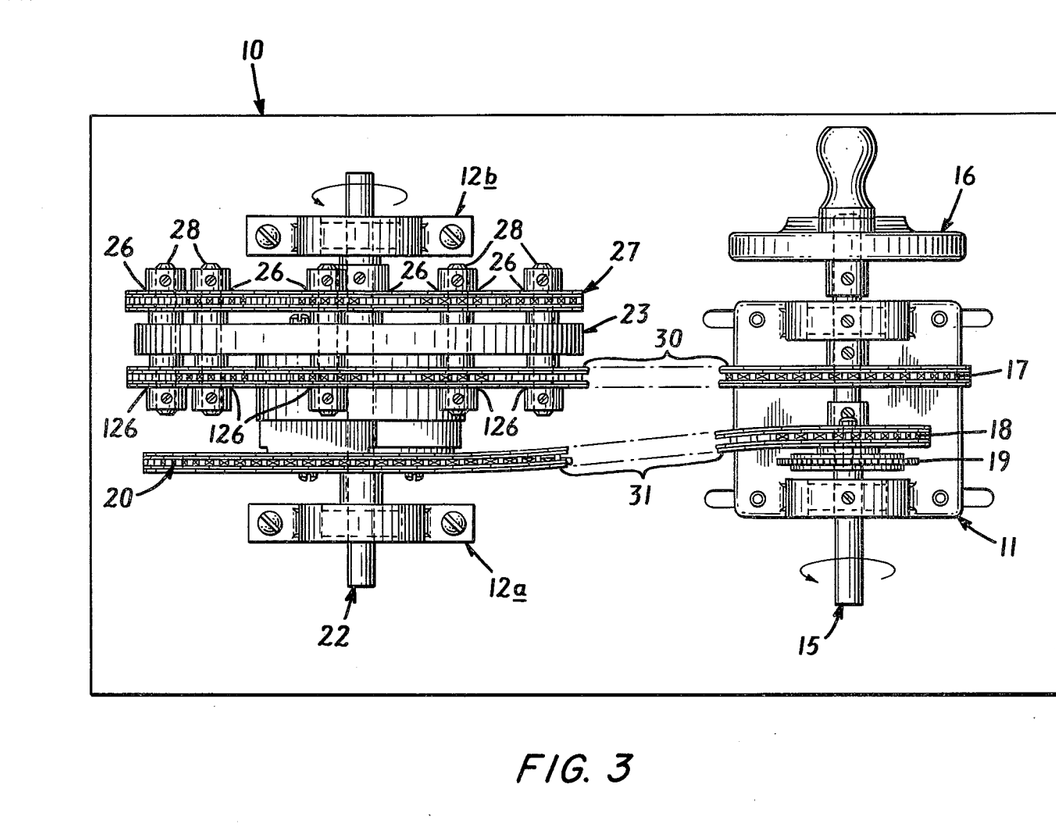
FIG. 3 is a top plan view of the apparatus of FIGS. 1 and 2 as depicted in FIG. 2.

As will be understood from FIGS. 1, 2, 3, and 5 the rotary carrier 23 rotatably carries an annular array of a plurality of angularly spaced satellite gear units, preferably in the form of a series of sprockets 26 which, as is shown in FIG. 2, may be nine in number, with two thereof 26a and 26b constituting an adjacent pair. It will be seen from FIG. 2 that a continuous inverted drive chain loop 27 has an outer run 27a lapped over the outer sides of the satellite gear units or sprockets 26 and then radially inward between the adjacent pair 26a and 26b of the latter, to continue to define an inner run 27b extending to connection to such outer run between such pair of satellite gear units and with this inner run lapped about the output gear 25 for rotary drive of the latter.

In FIG. 5 it is clearly indicated that the rotary mount of each of the satellite gear units or sprockets 26 thereof is by means of a rotary stub shaft 28 which rotatably extends through a bearing sleeve 29 supported through a transverse hole in the planetary satellite carrier 23. For convenience each of the stub shafts 28 is fitted with an additional sprocket 126 carried thereby on the opposite side of the rotary planetary satellite carrier disk 23. Thus, there is provided a second annular array of such a plurality of angularly spaced satellite gear units 126 for driven rotation about the axis of the later independently of rotation of this carrier and, as will be seen from FIGS. 1, 2, 3, and 5, an endless chain 30 is lapped about such second annular array of sprockets for drive from the sprocket 17 that is fixed upon the input shaft 15. As a result, this sprocket and chain assembly constitutes an input drive means drivably connected to such plurality of satellite gear units simultaneously to rotate them. This causes the continuous inverted drive chain loop 27 to be translated longitudinally so as to cause its inner run 27b to rotate the output gear or sprocket 25.

Another endless chain 31 is lapped about the drive sprocket 18 and the driven sprocket 20, so that when the drive sprocket 18 is rotated by the power input shaft 15 the sprocket 20 will be driven for rotating the carrier disk 23. This constitutes a second input drive means to rotate the planetary satellite carrier. It will also be noted that since smaller driving sprocket 19 is fixed to larger driving sprocket 18, and that thus both are carried by and fixed to the driving shaft 15, the entrainment of driving endless chain 31 over such smaller driving sprocket rather than over such larger driving sprocket will effect a speed change to provide under certain circumstances certain directional rotation and reversal, as will be more fully explained hereinafter. In order to shift engagement of the endless chain 31 from one driving sprocket 18 to the other driving sprocket 19 this may be simply done by physical untracking from one and retracking onto and about the other, and vice versa. For this purpose one of a number of different types of conventional clutching mechanisms of either the frictional or the spline and spur gear engaging types may be employed for such purpose. Such means will constitute discontinuance of application of the rotary driving power to the satellite carrier intervening such shift from one such driving gear to the other or to allow disengagement of such driving power for allowing holding of the satellite carrier from turning.

In the second embodiment of the present invention, which is illustrated in FIGS. 6 to 9 incl., the driving mechanisms for rotating the satellite carrier and the output driven rotary member or shaft independently from the input subassembly are structurally simplified appreciably. As will be seen from a comparison of FIGS. 3 and 7 the embodiment of FIGS. 6–9 is essentially similar to the first embodiment of FIGS. 1–5 except for an inconsequential reversal of some of the parts, and materially in the economical omission of one of the annular arrays of the driven sprockets rotatably carried by the rotary satellite carrier. Accordingly, it will be seen that in the power input subassembly 13 the rotatable power input shaft 15 is provided with means to rotate it, e.g., the symbolic rotating structure 16, and carries fixed thereto a driving sprocket 18 about which is lapped the endless chain 31 for rotating by means of sprocket 20 the satellite carrier 123 in the output subassembly 14. Rotated power input shaft 15 also has fixed thereto driving sprocket 17 about which is lapped endless driving chain 130 which in turn is lapped about the annular array of driven sprockets 26 which are rotatably carried in an annular zone of the satellite carrier 123. It is to be understood that sprocket 20 of the output subassembly 14 is freely rotatably supported upon the output shaft 22, but is fixed to the satellite carrier 123 for rotation of the latter thereby.

Figure 6:
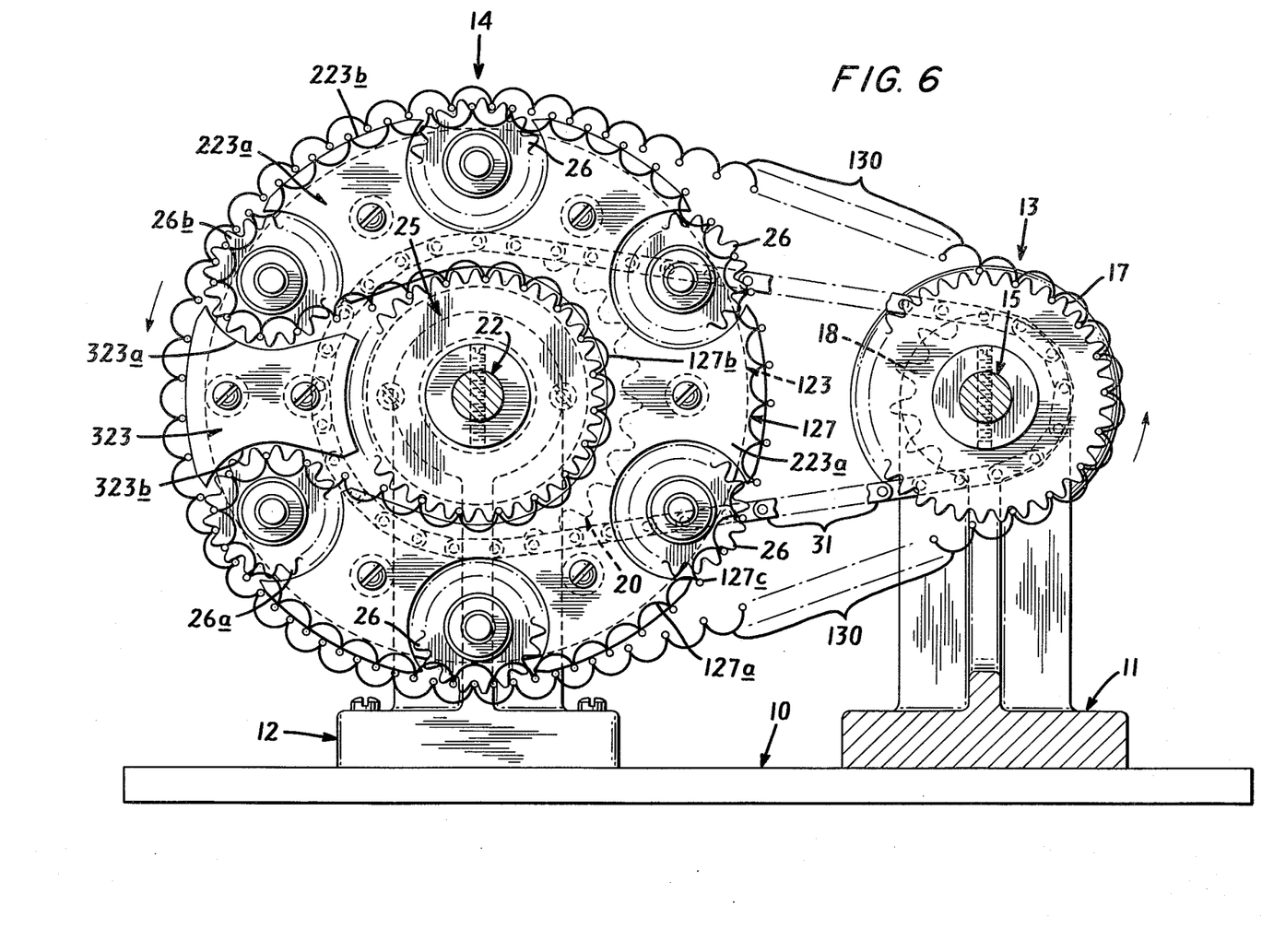
FIG. 6 is a side elevational view. with some parts indicated symbolically and others broken away and sectioned, of another embodiment of the apparatus of the present invention.
Figure 7:
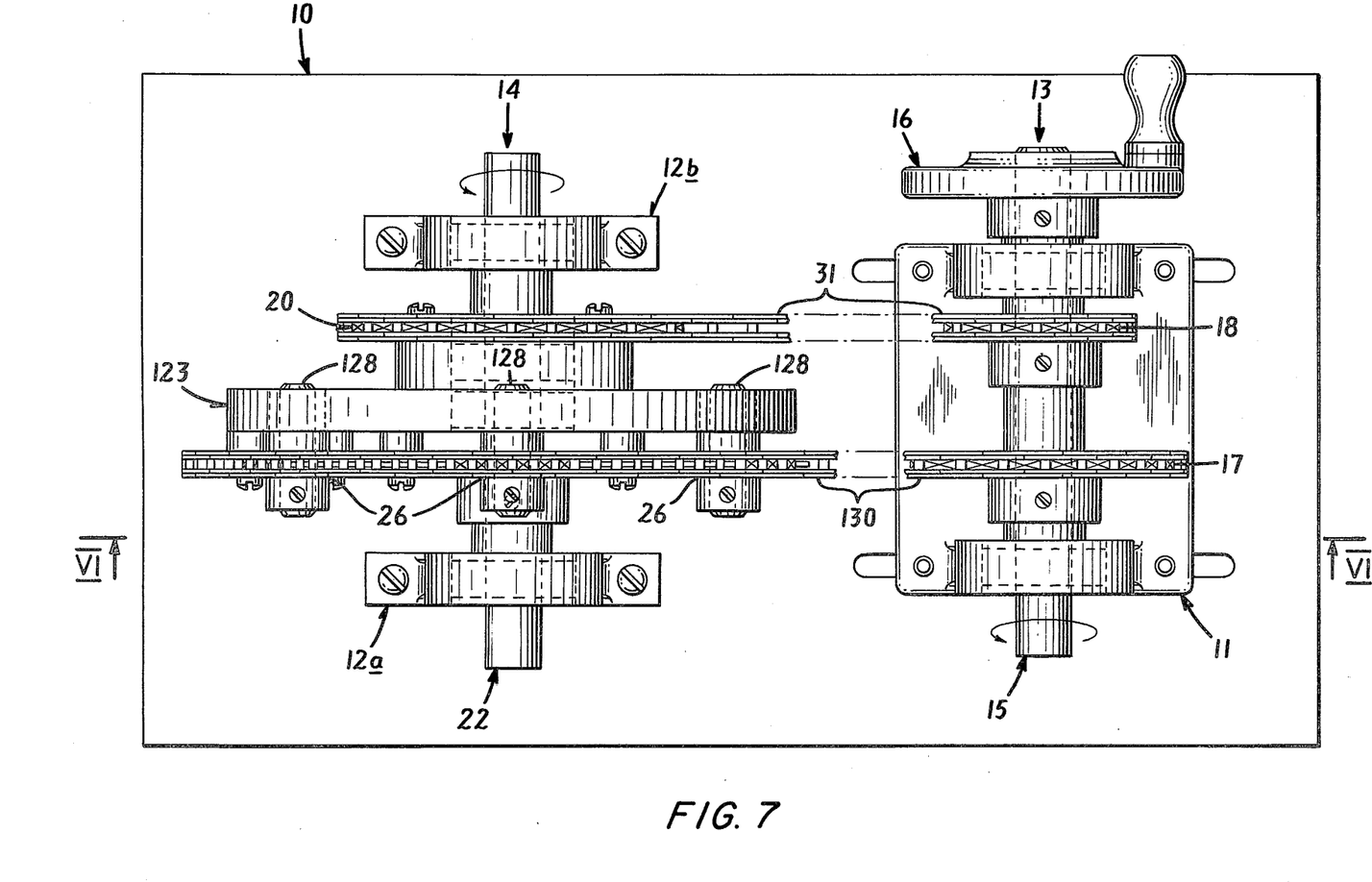
FIG. 7 is a top plan view, with some parts broken away and symbolically indicated, of the apparatus of FIG. 6.
Figure 8:
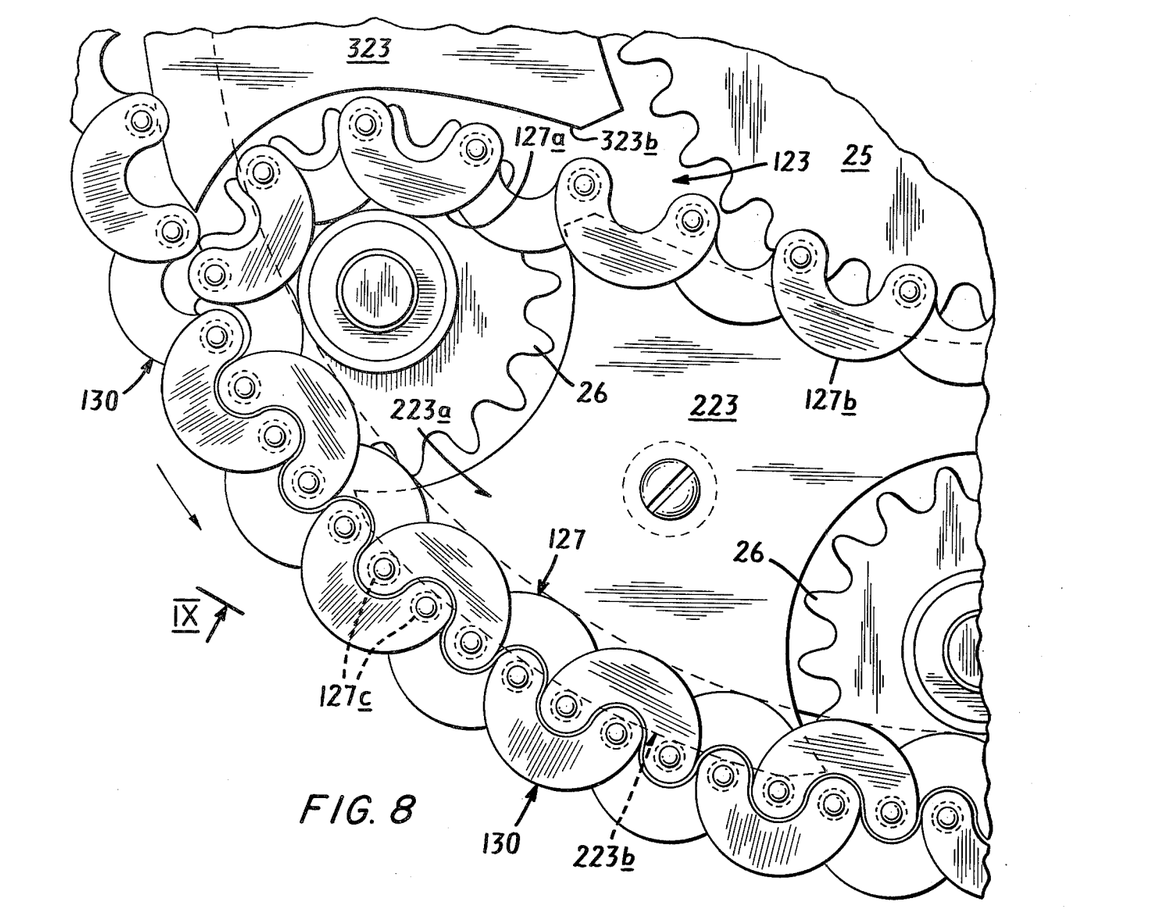
FIG. 8 is a side view to larger scale of a section of the left hand sub-assembly of FIG. 6, with parts broken away, illustrating the structures of the interfitting and superposed endless chain driving the annular array of satellite gears and the continuous inverted chain loop which drives from the latter the output means.
Figure 9:
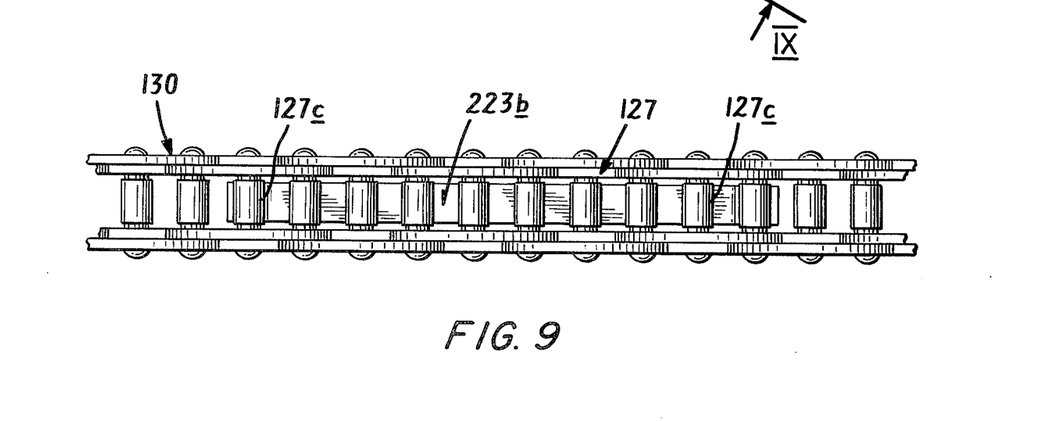
FIG. 9 is a plan view of parts of the superposed chains of FIG. 8 as viewed from the IX—IX plane.

It will be understood from FIGS. 6 to 9 incl. that the annular array of satellite sprockets 26 may be six in number and spaced at equal radial angles apart. As will be best understood from FIGS. 6, 8 and 9 there is bolted to the outer face of the satellite carrier 123 a plate 223 to provide a plurality of shaped radial blades 223a the side edges of which are in substantially the same plane as that common to the series of sprockets 26, the outer edges of these blades being curved along the arcs of the circle of the path which is defined by the chain link crosspins 127c, for secure guidance of the outer run 127a of the continuous inverted drive chain loop 127 (FIGS. 6 and 9). Such guidance assures that the outer run of such continuous chain loop is guided desirably along the circular path of the periphery of a circle having a diameter of that of the centers of the satellite sprockets 26 plus one satellite sprocket pitch diameter. It will also be seen in FIG. 6 that in the draping of the continuous inverted chain loop 127 about the satellite sprockets 26 the ends of the outer run 127a are ultimately lapped over the spaced pair of successive sprockets 26a and 26b to extend radially inward for then defining the inner loop 127b which is lapped about the output sprocket 25 for drive thereof. Since guide plate 223 and its radial blades 223a constitute a generally C-shaped member the gap between the opposed ends desirably is filled in by an extra blade 323, as will be seen from the left side of FIG. 6, with its shaped side edges 323a and 323b concavely shaped to provide guide surfaces for the transition lengths of the continuous inverted chain loop 127 which intervene its outer run 127a and its inner run 127b.

With the inner run 127b of the inverted continuous chain loop 127 about the output sprocket 25, which is fixed upon the output shaft 22, the latter are driven as rotary power output by such continuous inverted chain loop from the sprockets 26 as these sprockets are rotated by the endless chain 130 upon power input rotation of the driving sprocket 17. It will be understood that the number of satellite sprockets which are angularly spaced about and rotatably carried in an annular zone of the satellite carrier is not limited to any specific number at least from three onward except by structural space limitations. This is illustrated by the fact that there are nine such satellite sprockets in such annular array in the first embodiment of FIGS. 1 to 5 incl. and six in the second embodiment of FIGS. 6 to 9 incl. However, the fewer of such sprockets the greater the amount of care that is required for chain guidance about the satellite carrier for the purpose of assuring travel of a chain loop along the circular paths described above to attain desired accuracy in commercial embodiments.

It has been demonstrated that, by way of example, the illustrated embodiments, and particularly that of FIGS. 6 to 9 incl., will attain the following operative results. When driving sprocket 17 is rotated counterclockwise as viewed in FIG. 6 it will drive the endless chain 130 in its loop about the annular array of satellite sprockets 26 counterclockwise so that the inner run 127b of the continuous inverted chain loop 127 will be translated clockwise to rotate the output sprocket 25 and output shaft 22 in such clockwise direction. The ratio of the rotary advances of these driving and driven sprockets will be that of the pitch diameters thereof. This result assumes that the satellite carrier 123 is held such as by preventing it from turning with disengagement of the endless chain 31 from either the driving sprocket 18 or driven sprocket 20 about which this chain is lapped. It will readily be understood by those skilled in the art that such condition may be attained without untracking such endless chain if the connection between the driving input shaft 15 and the driving sprocket 18 is through conventional clutch mechanism which may take a variety of forms either of the frictional engagement or gear engagement types. Such holding of the satellite carrier 123 may be by means of a suitable brake. It will further be understood that if the satellite carrier 123 is permitted to turn and it is driven by the sprocket 20 fixed thereto through drive of the chain 31 by driving sprocket 18 this satellite carrier will be driven counterclockwise in the ratio of the pitch diameter of this driving sprocket to the pitch diameter of this driven sprocket. With the satellite carrier 123 rotating counterclockwise the driven output sprocket 25 will be driven counterclockwise in the ratio of the pitch diameter of the circular track of the outer run 127a of the continuous inverted chain loop 127 about the satellite sprockets 26 to the pitch diameter of this output sprocket.

Such residual gearing action of embodiments of the present invention may be expressed and determined in a manner somewhat as follows.

If "R" represents the revolution of the output sprocket 25 and the shaft 22 on which it is fixed as the input shaft 15 is rotated one revolution the output action of such apparatus may be expressed by the following formula:

$$R = \frac{A}{B}\left(1 + \frac{C}{D}\right) - \frac{E}{D};$$

wherein
$A$ = number of teeth on satellite carrier driving sprocket (e.g., 18),
$B$ = number of teeth on the driven satellite carrier sprocket (e.g., 20),
$C$ = number of teeth of a sprocket which would have its pitch diameter equal to the diameter of a circle through the centers of the satellite sprockets (e.g., 26) plus the diameter of one of the latter,
$D$ = number of teeth on output sprocket (e.g., 25),
$E$ = number of teeth on the driving sprocket (e.g., 17) which chain drives the satellite sprockets.

Assuming the following values of
$A = 24, B = 75, C = 82, D = 44,$ and $E = 42$ then $$1.\ R = \frac{24}{75}\left(1 + \frac{82}{44}\right) - \frac{42}{44} = -.038, \text{ or}$$

$A = 26$ with the other values the same as above, then $$2.\ R = \frac{26}{75}\left(1 + \frac{82}{44}\right) - \frac{42}{44} = +.038.$$

Therefore, $1/.038 = 26.31$ which is the number of revolutions of the input shaft required to cause the output shaft, or its driven sprocket, to make one revolution.

For obvious reasons the drive transfer means between the driving input subassembly 13 and driven output subassembly 14 may be other than chain drives, if desired, such as trains of meshed gears.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is the novel subjects matter defined in the following claims.

1. Residual gearing transmission comprising
   1. a rotary planetary satellite carrier rotatably carrying an annular array of a plurality of angularly spaced satellite gear units for driven rotation about the axes of the latter independently of rotation of said carrier;
   2. an output gear rotatably mounted coaxially with respect to said carrier and rotatable independently of the latter;

3. a continuous inverted drive chain loop having an outer run lapped over the outer sides of said satellite gear units and radially inward between an adjacent pair of the latter, and an inner run extending to connection to said outer run between said pair of satellite gear units with said inner run lapped about said output gear for rotary drive of the latter;

4. first input drive means drivably connected to said plurality of satellite gear units simultaneously to rotate the latter; and 5. second input drive means to rotate said planetary satellite carrier.

2. The residual gearing transmission defined in claim 1 characterized by said first input drive means for said satellite gear units including an input drive shaft, a drive sprocket mounted on said shaft for rotation therewith, and an endless drive chain lapped about said drive sprocket and arranged about said satellite carrier in driving association with said satellite gear units to rotate the latter and translate said inverted drive chain loop at certain speeds for rotating said output at a predetermined speed.

3. The residual gearing transmission defined in claim 2 characterized by said second input drive means including a rotary power source and means drivably to connect it to said satellite carrier, and means to discontinue application of the rotary driving power to said satellite carrier for holding the latter from turning.

4. The residual gearing transmission defined in claim 2 characterized by said second input drive means including a second drive sprocket mounted on the same input drive shaft for rotation therewith, a driven sprocket mounted to said satellite carrier, and a second endless drive chain lapped about said driven sprocket and said second drive sprocket for rotary drive of said satellite carrier.

5. The residual gearing transmission defined in claim 4 characterized by said satellite gear units being of such construction in relation to the constructions of said second endless drive chain and said continuous inverted drive chain loop as to cause translation of the latter and rotation of said output gear upon rotation of said gear units by said second endless drive chain.

6. The residual gearing transmission defined in claim 5 characterized by said second endless drive chain and said continuous inverted drive chain loop which are superposed in interlocking relationship with links of this drive chain lapping over links of this chain loop whereby they track together over each of said gear units with the latter in the form of a conventional sprocket.

7. The residual gearing transmission defined in claim 5 characterized by each of said gear units being in the form of a pair of sprockets coaxially fixed together upon a stub shaft so mounted in an annular zone of said satellite carrier for free rotation of said sprockets together, said second endless chain being trained over one set of said gear unit sprockets for drive of the latter and with said outer run of said inverted drive chain loop trained over the other set of said gear unit sprockets for direct drive of this loop by said sprockets from said endless drive chain.

\* \* \* \* \*